Patented Oct. 19, 1926.

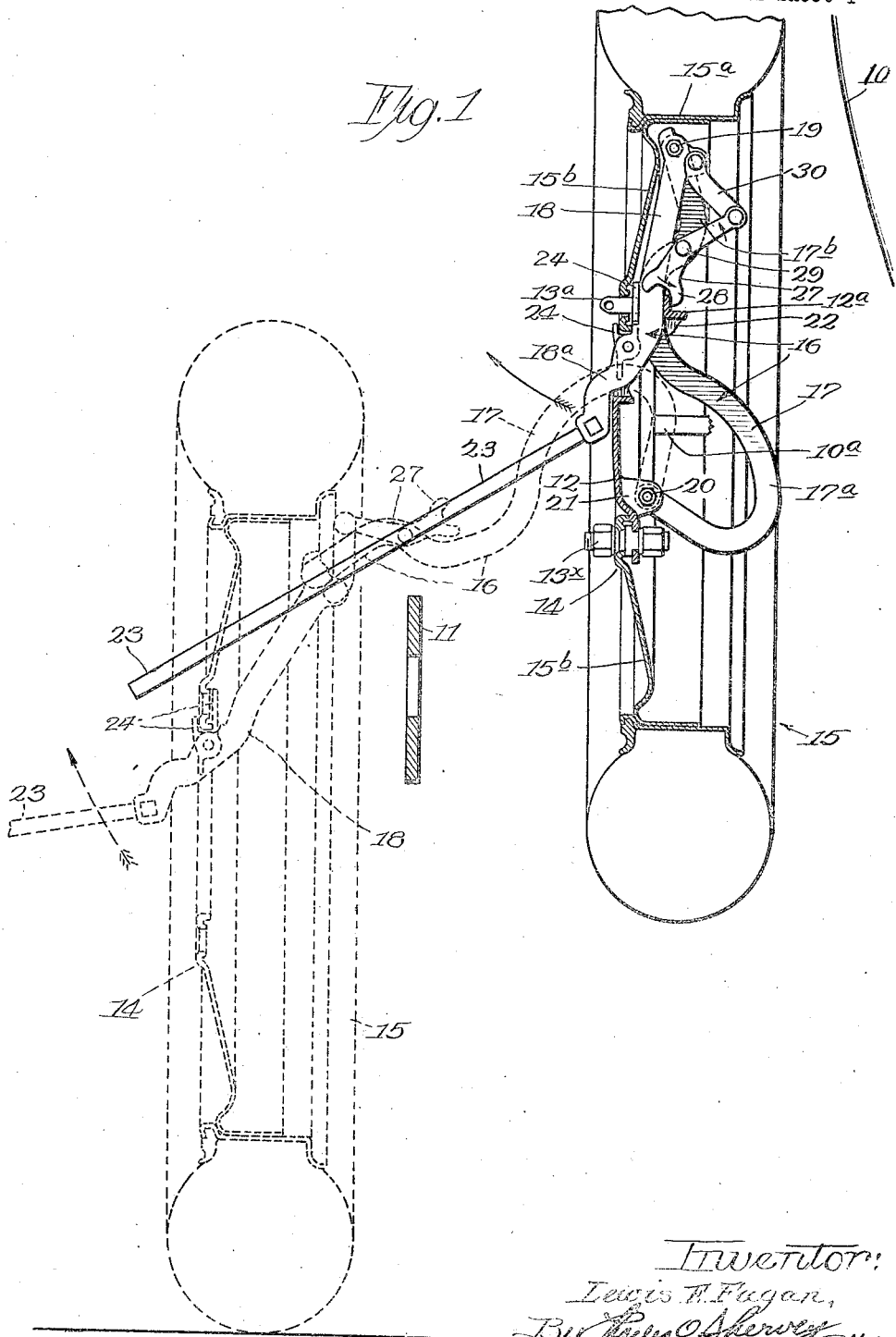

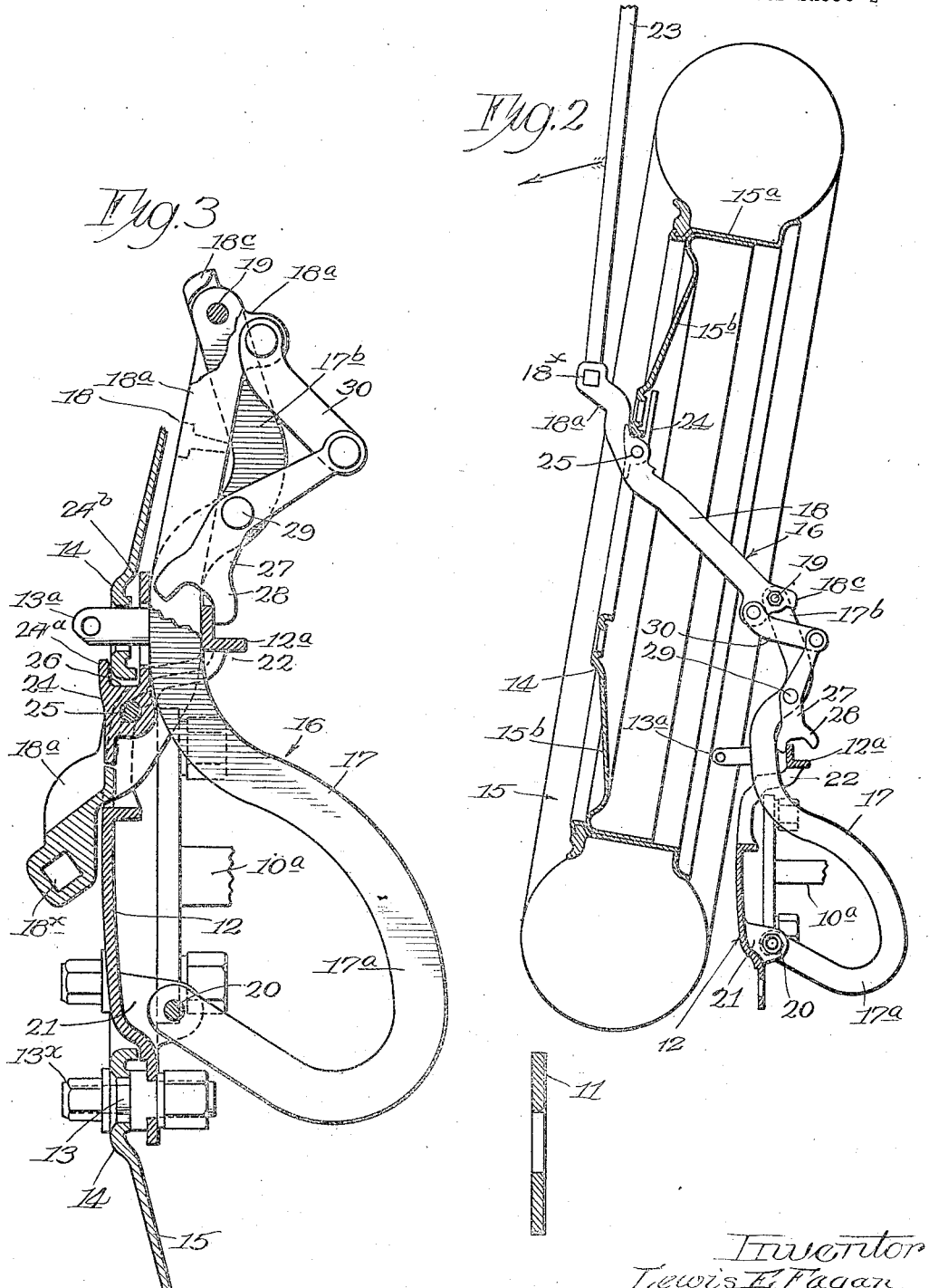

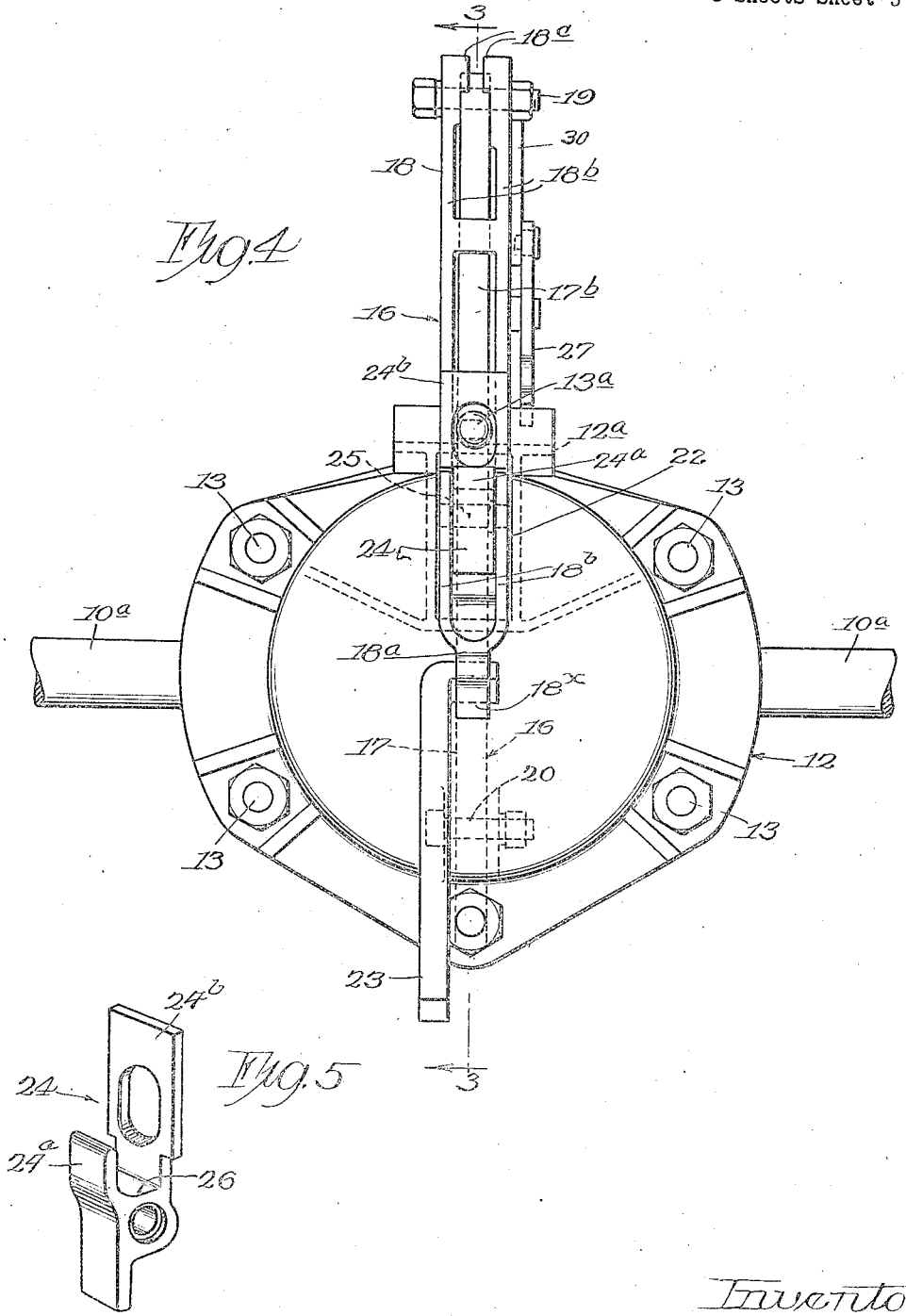

1,603,527

UNITED STATES PATENT OFFICE.

LEWIS E. FAGAN, OF CHICAGO, ILLINOIS, ASSIGNOR TO EMIL BLUMENTHAL, OF EVANSTON, ILLINOIS; L. E. FAGAN. OF CHICAGO, ILLINOIS; AND E. G. TROWBRIDGE, OF WINNETKA, ILLINOIS, TRUSTEES FOR B. F. T. COMPANY, OF CHICAGO, ILLINOIS.

RAISING AND LOWERING DEVICE FOR DEMOUNTABLE WHEELS AND RIMS.

Application filed January 15, 1926. Serial No. 81,456.

This invention relates to wheel raising and lowering devices for motor vehicles, and its primary object is to provide a wheel handling device, capable of use on a wheeled vehicle equipped with a rear bumper. Usually the rear bumpers of automobiles or other motor vehicles are placed so as to protect the spare tire and wheel or rim as well as the gasoline tank, body and fenders of the vehicle. Often the spare wheel is carried between the body of the car and the bumper, which makes it difficult to lift and place the wheel on the carrier and to remove it therefrom and lower it to the ground. This is especially noticeable when heavy wheels and tires are used on the car. The present invention has been designed to overcome these objectionable features, and render the task less irksome and laborious. The principal difficulty met with in devising a lifting and lowering device for wheels for an automobile equipped with a rear bumper, is that of enabling the device to lift the wheel over the bumper, both during the operation of lowering the wheel from its carrier to the ground, or when lifting a wheel from the ground and placing it on the carrier. I have overcome this difficulty by providing a two piece, jointed wheel lifting lever, fulcrumed on a stationary support, and having a wheel carrying member or seat so positioned on the lever that the lever may lift the wheel free and clear of the bumper, the joint in the lever affording means whereby one arm of the lever may be swung relative to the other, to thereby move the wheel from a position above the bumper to one behind and partly below it.

The invention consists in a wheel raising and lowering device comprising a two piece jointed lever fulcrumed at one end to a support, and having a wheel carrying member or seat thereon, movable in an arc of a circle described about said fulcrum, from a position on the ground to one in which the wheel is raised above the bumper, or lowered from such raised position to the ground, said wheel carrying member or seat being movable in a separate arc of a circle, described about the joint or fulcrum, between the two arms of the jointed lever, whereby the wheel may be lowered from such raised position to one below and behind the bumper, or raised from a position below and behind the bumper to the raised position thereabove, whereby the wheel may be raised bodily from the ground and lifted over the bumper and deposited in carried position, by simply swinging the entire lever on its fulcrum, and thereafter swinging one arm on its fulcrum on the main arm, and returned to the ground by reversing the direction of movement of said arm and whole lever. The invention further consists in a raising and lowering device of the character above set forth, in which means are provided for temporarily securing the main arm of the lever against movement on its fulcrum, while the other arm is being manipulated. It further consists in the provision of combined auxiliary lever actuating and holding means, operated by one of the jointed members of the lever. It further consists in the several novel features of construction, arrangement and combination of parts hereinafter fully described and claimed.

The invention is clearly illustrated in drawings accompanying this specification, in which:—

Fig. 1 is a view, partly in side elevation and partly in vertical cross section, of a wheel raising and lowering device, illustrating a simple embodiment of the invention, and showing the same applied to an automobile equipped with a rear bumper, the view illustrating the device in solid lines, with the wheel in raised or carrying position, and in dotted lines with the wheel resting on the ground; Fig. 2 is a view similar to Fig. 1, but showing the parts in the position assumed when the wheel has been raised to its highest position over the bumper; Fig. 3 is a detail, vertical, cross section taken on the line 3—3 of Fig. 4; Fig. 4 is a front elevation of the device with the wheel omitted from the view and Fig. 5 is a perspective view of a wheel carrying member or seat which engages and takes hold of the wheel during the raising and lowering operations.

Referring to said drawings, which illustrate a simple embodiment of the present invention, the reference character 10 designates a fragment of the body of an automobile or other motor vehicle and 11 the rear bumper thereof. Rear bumpers usually contain a horizontal cross bar which is spaced away from the automobile body so as to leave room for the spare wheels and tires intended for use in case of an emergency, such as a puncture or injury to a wheel.

Supported by the body or frame work of the vehicle, as for instance by arms 10a, is a carrier plate 12, usually provided with studs 13 adapted to enter bolt holes in the hub flange 14 of the wheel 15 which is to be carried by the carrier plate. The stud marker 13a may be formed with a slot for the reception of the bow of a padlock (not shown), whereby the wheel may be locked to the carrier plate against removal by an unauthorized person.

Fulcrumed upon the carrier plate 12 as at 20. is a two piece lever 16, one arm 17 of which comprises the main arm of the lever, and one arm 18 comprises an arm extension thereof, the two arms being pivotally or hingedly connected or jointed together by a hinge pin 19. The lever 16 is capable of a swinging or oscillatory movement, as a rigid whole, about the fulcrum pin 20, and the arm extension 18 is capable of a swinging or oscillatory movement, independent of the arm 17, on the hinge pin or fulcrum pin 19. The purpose of the jointed lever 16, having a fixed fulcrum and a movable fulcrum, is to enable the wheel 15 to be raised from a position resting on the ground (see Fig. 1) to one located slightly above the bumper 11 (see Fig. 2), and lowered from such raised position to the ground, and also lowered from such raised position to a carrying position behind and somewhat below the bumper (see Fig. 1), and to be lifted from such carrying position to the raised position above the bumper, thereby enabling the user to raise the wheel over the bumper to the carrier plate, and to take it from the carrier plate, bring it over the bumper, and lower it to the ground, without any great effort.

Describing more specifically the construction of parts shown for accomplishing this result, the carrier plate 12 is formed with two lugs 21 on its rear face, between which lugs the lever 16 is held by the fulcrum pin 20. In situations where the lever 16 is fulcrumed on the back of the carrier plate, the latter is formed near its upper edge portion 12a, with a slot 22, through which the lever projects from front to back, and the lever is formed with a bowed or bent portion 17a, which bent part may be roughly U shaped in form, to enable the lever to pass through the slot 22, when being swung down to the position indicated by the dotted lines in Fig. 1. This arrangement also permits the slots 22 to be made as narrow (vertically) as possible, to prevent weakening of the carrier plate. The carrier plate is reinforced by strengthening ribs, as shown, to afford a solid and substantial wheel carrying member. In the form shown, the upper or free end 17b of the lever arm 17 is bent back and up, terminating at a point slightly below the top of the wheel rim 15a and directly behind the web or body 15b of the wheel 15 (see Fig. 1), when in carrying position of the device. When in this position, the lever arm 17 is temporarily locked or latched against movement on its fulcrum 20, as will appear later, and the wheel is at such times supported by the studs 13 and secured thereon by the nuts 13x that accompany them as usual.

In this normal or inactive position of the lever 16, the arm extension 18 thereof extends downwards from its fulcrum 19, on the arm 17, and its free end 18a projects forwards through the hub aperture of the hub portion 14 of the wheel, where it is formed with a handle socket 18x in which a handle 23 may be secured whenever the device is to be used in raising or lowering a wheel. Conveniently the socket is non-circular and the handle is formed with a non-circular end fitting therein, so that when the handle is attached to the lever arm 18 the two act as a rigid, unitary structure. The handle 23 may be stored in the tool box or other storage place with which automobiles are usually provided. As a preference, the arm extension 18 is forked, the two legs 18b of the fork straddling the upper end 17b of the lever arm 17 (see Fig. 4) and joining with each other at the socketed end. The ends of the forks 18b which receive the fulcrum pin 19 are formed with shoulders or lugs 18c which act as stops that limit the movement of the arm extension 18 in one direction, said shoulders or lugs being arranged to strike the lever arm 17 when the arm extension is swung into the position seen in Fig. 2. This arrangement provides an elbow joint between the two arms 17, 18, which affords a limited amount of angular movement between the two arms, and determines a place where the two arms become, to all intents and purposes, a single, rigid, unitary lever structure, movable as a whole about the fulcrum 20.

The stud 13a, above referred to, is secured to the arm extension 18 at a place thereon coinciding with the uppermost bolt hole in the hub flange 14, and projects through said bolt hole when the lever is in inactive or normal position (see Figs. 1 and 3). Located below the stud 13a, and between the legs 18b of the arm extension 18 is a wheel carrying member 24, which is somewhat in the form of a hook (see Fig. 5) that engages with and takes hold of the hub flange 14 of the wheel and acts as a seat upon which the wheel rests during the raising and lowering movements of the lever. The wheel carrying member 24 is pivotally mounted on the lever 16 by a pivot pin 25, which is secured in the two legs 18$^b$ of the arm extension 18 and extends through a bearing aperture in the wheel carrying member 24. An anti-rattler washer may be placed around the pivot pin and between one leg 18$^b$ and wheel carrying member 24, to frictionally hold said member in place. The seat portion 26 is located between two upstanding lugs 24$^a$, 24$^b$, which are spaced apart a sufficient distance to accommodate the hub flange between them (see Fig. 3), and the lug 24$^b$ is formed with an aperture through which the stud 13$^a$ may project and enter the bolt hole of the wheel. When the wheel is bolted to the carrier plate, the hub flange is free of the seat 26 (see Fig. 3), and the entire weight of the wheel is carried by the studs 13. When, however, the arm extension 18 is swung upward to disengage the wheel from the carrier, the seat 26 comes into engagement with the hub flange and takes up the load and draws the wheel away from the studs 13. In order that the wheel may be lifted over the bumper, the seat of the wheel carrying member is spaced a considerable distance away from the pin 19 and below it when the parts are in normal position.

To prevent the lever 16, as a whole, from tilting forward on its fulcrum 20, especially when the arm extension is being swung upward from the position seen in full lines in Fig. 1, and to aid in thrusting the wheel forward when the arm extension is swung upward, (especially when the wheel is carried at an angle to the vertical, as it is in some cases) a latch hook or lever locking member 27 is employed, which, in the form shown, is pivotally mounted as at 29, between its ends, on the part 17$^b$ of the lever arm 17, and it has a forked end 28 which engages over a flanged part of the upper end portion 12$^a$ of the carrier plate, the flange entering the gap between the two forks of the latch hook. The other end of the latch hook 27 is connected to the arm extension 18, at a point adjacent the fulcrum 19, by a link 30. The pivoted connections between the latch hook, link, and arms 17, 18 may comprise rivets, bolts or the like as desired, and the arrangement of the parts just described is such that any tendency for the latched lever 16, as a whole, to swing forward on the fulcrum 20 is resisted by the latch hook, since its forked end engages with the stationary carrier plate, and forward movement of the lever as a whole would tend to rock the latch hook on the carrier plate as a fulcrum, thereby tending to lengthen the distance between the pivot points of the latch hook 27 and arm 17 and the link 30 and arm 18, which cannot be done.

In the operation of the device, to lower a wheel from the carrier to the ground, the nuts 13$^x$ and padlock are removed, and the handle 23 inserted in the handle socket of the lever (see solid line position of parts in Fig. 1. The handle is then raised to the position seen in Fig. 2, the arm extension 18 turning upon the fulcrum pin 19 and lifting the wheel high enough to pass over the top of the bumper 11. During this upward movement of the arm extension 18, the pivot pin of the link connection 30 therewith is moved in an arc of a circle about the fulcrum 19 and moves the link 30 to the left, as viewed in Figs. 1 and 2, thereby swinging the latch hook 27 on its pivot pin 29 in the direction of the arrows thereon, Fig. 1, bringing the front fork of the hook into engagement with the carrier plate and moving the lever arm 17 forward on its fulcrum 20, the rear fork of the latch hook at this time swinging up sufficiently to clear the carrier plate as the parts are thereafter swung forward and down as a whole. At this point, the lugs 18$^c$ of the arm extension 18 engage with the lever arm 17 and make the two arms rigid, and the handle 23 is thereupon swung forward and downward, and the lever 16 as a single unit is thereupon swung on its fulcrum 20 until the wheel is deposited upon the ground, as seen in dotted lines in Fig. 1, all of the parts being entirely free and clear of the bumper. The handle 23 is now detached from the arm extension 18 and the lever permitted to swing down until it comes to rest, and the wheel is then moved out of the wheel carrying member 24 and taken away for the desired purpose. During the movement of the arm extension upon its fulcrum 19, and during the movement of the entire lever upon the fulcrum 20, the wheel rests on the wheel carrying member 24, which, being swiveled on the lever, and the center of gravity of the wheel being below the swing, remains approximately upright and holds the wheel approximately upright until it rests on the ground. To replace the wheel, the hub flange of the wheel is placed on the seat of the wheel carrying member, the handle inserted into the socket, the lever swung upward to its upper limit, and the arm extension then swung down, the nuts 13$^x$ and padlock replaced and the handle withdrawn.

From the above, it will be seen that the two arms 17, 18, when rigid, serve as a lever fulcrumed at one end and having a wheel carrying member between its ends on which the wheel is raised to a position above the bumper and lowered to the ground. Furthermore, the arm extension 18, by itself, acts as a lever, fulcrumed on the end of the lever arm 17, which then acts as a strut or support for the fulcrum of the arm extension, and in this condition the wheel carrying member, being mounted on said arm extension, carries the wheel from said raised position to the carrier plate.

It is also apparent that the wheel may be easily and quickly raised from the ground, lifted over the bumper and deposited on the carrier plate with little effort, and likewise may be lowered to the ground. When the device is used on an automobile on which the spare wheel is supported at a considerable angle to the vertical, the fulcrum of the latch member may be raised to increase the length of its forked arm, and the space between the forks is narrowed, and other slight changes are made in the shape of the parts. The latch member thereby causes the jointed wheel carrying lever to move farther away from the carrier plate during the time that the arm extension is being swung up, thereby bringing the wheel into an approximately vertical position, before the wheel carrying lever is swung down, as a whole, to lower the wheel to the ground. When returning the wheel to the carrier plate, the latch member engages the carrier plate while the wheel is still being supported in an approximately vertical position by the lever and breaks the fall of the wheel, to the carrier plate, as the arm extension is being swung down to lower the wheel to the carrier plate.

The parts are few and simple. They are strong, substantial and not easily broken. The parts may be altered slightly, if necessary, to accommodate the device to the various types of automobiles without making any radical departures.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A wheel raising and lowering device, comprising a support, a hinged together, two part main lever, fulcrumed at one end on said support, and both parts of said lever cooperating to act as a rigid unit, and one part of said main lever comprising a separate lever capable of oscillation with respect to the other part of the lever, and having an associated wheel carrying seat located at a considerable distance away from the hinge connection between the two parts of the main lever.

2. A wheel raising and lowering device, comprising a support, a hinged together, two part lever, fulcrumed at one end on said support, both parts of said lever cooperating to act as a rigid unit, movable on said fulcrum, and one part being in the form of a separate lever capable of independent oscillatory movement on the other part, said separate lever having a wheel carrying member swiveled thereon between its ends.

3. A wheel raising and lowering device, comprising a support, a lever structure fulcrumed thereon and comprising two hinged together arms, having means for holding the arms in fixed relation, whereby they cooperate to move as a rigid member, and one arm being in the form of a separate lever capable of oscillation upon the other through a limited extent, and a wheel carrying member upon said independently oscillating lever having a wheel sustaining seat, supportingly engaging the wheel at a point considerably below the hinge connection between the two arms of the lever and movable upward from such position.

4. A wheel raising and lowering device, comprising a support, a lever structure fulcrumed on said support and comprising two arms having an elbow joint connection between them, whereby they may move together as a fixed structure, and one being in the form of a separate lever capable of movement on the other through a limited extent, and a wheel carrying member on said independently movable lever having a wheel sustaining seat, supportingly engaging the wheel at a point considerably below the hinge connection between the two arms of the lever and movable upward from such position.

5. A wheel raising and lowering device, comprising a support, a lever structure fulcrumed on said support and comprising two arms having an elbow joint connection between them, whereby they may move together as a fixed structure and one being in the form of a separate lever capable of movement on the other through a limited extent, and a wheel carrying member, having two upstanding lugs and a seat therebetween for receiving the hub flange of a wheel, said wheel carrying member being swiveled to said independently movable lever with its seat supportingly engaging the hub flange of the wheel at a point considerably below the hinge connection between the two arms of the lever and movable upward from such position.

6. A wheel raising and lowering device, comprising a carrier plate, having wheel supporting studs thereon, a lever structure fulcrumed on said carrier plate and comprising two hinged together arms, having means cooperating to hold said two arms in rigid condition, and one being in the form of a separate lever capable of oscillatory movements on the other through a limited extent, and a wheel carrying member on said independently movable lever having a wheel sustaining seat, supportingly engaging the wheel at a point considerably below the hinge connection between the two arms of the lever and movable upward from such position.

7. A wheel raising and lowering device, comprising a slotted carrier plate, a lever structure fulcrumed on said carrier plate at the rear thereof and projecting through said slot, said lever structure comprising two hinged together arms, having means cooperating to hold said two arms in rigid condition, and one being in the form of a separate lever capable of oscillatory movements on the other through a limited extent, and a wheel carrying member on said independently movable lever having a wheel sustaining seat, supportingly engaging the wheel at a point considerably below the hinge connection between the two arms of the lever and movable upward from such position.

8. A wheel raising and lowering device, comprising a carrier plate, a lever structure fulcrumed on said carrier plate, and comprising two hinged together arms having means cooperating to hold said two arms in rigid condition, and one being in the form of a separate lever capable of oscillatory movement on the other arm through a limited extent, and wheel carrying means associated with said independently movable lever having a wheel sustaining seat, supportingly engaging the wheel at a point considerably below the hinge connection between the two arms of the lever and movable upward from such position.

9. A wheel raising and lowering device, comprising a carrier plate, a two part lever fulcrumed thereon, and having an elbow joint connection between the two parts of the lever, whereby the lever may function as a rigid, unitary, rocking structure, and one part thereof may function separately as a lever capable of rocking on its joint on the other part of the lever, and wheel carrying means associated with the independently movable part of the lever, whereby said wheel carrying means is movable through an arc of a circle having a long radius, and through another arc of a circle having a relatively short radius.

10. A wheel raising and lowering device, comprising a support, a hinged together two part lever fulcrumed on said support, one part of said lever being in the form of a separate lever, independently movable on the other part of the two part lever, an automatically operating latch device pivotally mounted on said other part of the lever, and arranged to lockingly engage with said support, and an operative connection between said independently movable part of the lever and said latch device, said independently movable part of the lever, the connection and the latch device co-operating to lockingly secure said other part of the lever against movement relative to the support.

11. A wheel raising and lowering device, comprising a support, a hinged together two part lever fulcrumed on said support, one part of said lever being independently movable on the other part of the lever, a latch member fulcrumed on one of said parts of the lever and arranged to lockingly engage with said support, and a link connecting said latch member with the other arm of the lever and co-operating therewith to release said latch from the support when the independently movable part of the lever is moved in one direction.

12. A wheel raising and lowering device, comprising a support, a hinged together two part lever fulcrumed on said support, one part of said lever being independently movable on the other part of the lever, a latch member fulcrumed on one of said parts of the lever and having a forked end lockingly engaging with said support, and a link connecting the other end of said latch member to the other arm of the lever, whereby when said last mentioned arm of the lever is moved in one direction said forked end of the latch member is lockingly engaged with said support, and when said last mentioned arm is moved in the opposite direction, the forked end of the latch member is unlocked from said support, and the latch member effects an initial movement of the lever structure on its fulcrum.

13. A wheel raising and lowering device, comprising a carrier plate, a lever structure fulcrumed on said carrier plate, and comprising two hinged together arms having means cooperating to hold said two arms in rigid condition, and one being capable of oscillatory movement on the other arm through a limited extent, wheel carrying means associated with said independently movable arm, a latch member fulcrumed on one of said arms, and arranged to lockingly engage said carrier plate, and a link connecting said latch member with the other arm of the lever and cooperating therewith to release said latch member from the carrier plate when the independently movable arm is moved in one direction relative to the other.

14. In a wheel raising and lowering device, the combination with a support and a wheel lifting and lowering lever fulcrumed thereon, of a combined latch and lever shifting member, arranged in one position of the lever to lockingly engage said support, and operative connections between said lever and combined latch and lever shifting member for actuating the latter.

15. A wheel raising and lowering device, comprising a support, a hinged together, multiple part lever, fulcrumed at one end on said support, parts of said lever cooperating to act as a rigid unit, and one part of said lever being in the form of a separate lever having wheel carrying means associated therewith, and normally located below the hinge connection of the part with which the carrying means is associated, said part of the lever being capable of oscillation with respect to the other part of the lever.

16. A wheel raising and lowering device, comprising a support, a hinged together, multiple part lever, fulcrumed at one end on said support, parts of said lever cooperating to act as a rigid unit, movable on said fulcrum, and one part being in the form of a separate lever capable of independent oscillatory movement on the other part, and having a wheel carrying member swiveled thereon, movable from a position below the hinge connection between the two hinged together parts of said lever to a position above said hinge connection.

17. A wheel raising and lowering device, comprising a support, a lever structure fulcrumed thereto and comprising hinged together arms, having means for holding the arms in fixed relation, whereby they cooperate to move as a rigid member, and one arm being in the form of a separate lever capable of oscillation upon another through a limited extent, and a wheel carrying member upon said independently oscillating arm, movable from a position below the hinge connection between the two hinged together parts of said lever to a position above said hinge connection.

18. In a wheel raising and lowering device, a support, a hinged together, jointed, wheel carrying lever, fulcrumed on said support, and movable toward and away from said support as a rigid structure, one member of the lever being capable of independent movement upon and toward and away from the other member of the lever, and an auxiliary lever moving element cooperating with said independently movable member and support, to transmit movement from the independently movable member to the lever as a whole.

19. In a wheel raising and lowering device, a support, a hinged together, jointed, wheel carrying lever, fulcrumed on said support, and movable toward and away from said support as a rigid structure, one member of the lever being capable of independent movement upon and toward and away from the other member of the lever, an auxiliary lever moving element arranged to be interposed between said wheel carrying lever and support and cooperating with said independently movable member and support, to transmit movement from the independently movable member to the lever as a whole.

20. In a wheel raising and lowering device, a wheel support, a hinged together, jointed, wheel carrying lever, fulcrumed on said support, and movable toward and away from said support as a rigid structure, one member of the lever being capable of independent movement upon and toward and away from the other member of the lever, and an auxiliary lever moving element cooperating with said independently movable member and support to retard the movement of the lever, as a whole, when the independently movable member of the lever is moved in a direction to seat the wheel on said support.

LEWIS E. FAGAN.